Nov. 7, 1967   E. M. SODANO   3,351,942
METHOD FOR THE DETERMINATION OF DISTANCE AND/OR DIRECTION
BETWEEN NON-INTERVISIBLE DISTANT STATIONS
Filed Aug. 26, 1964
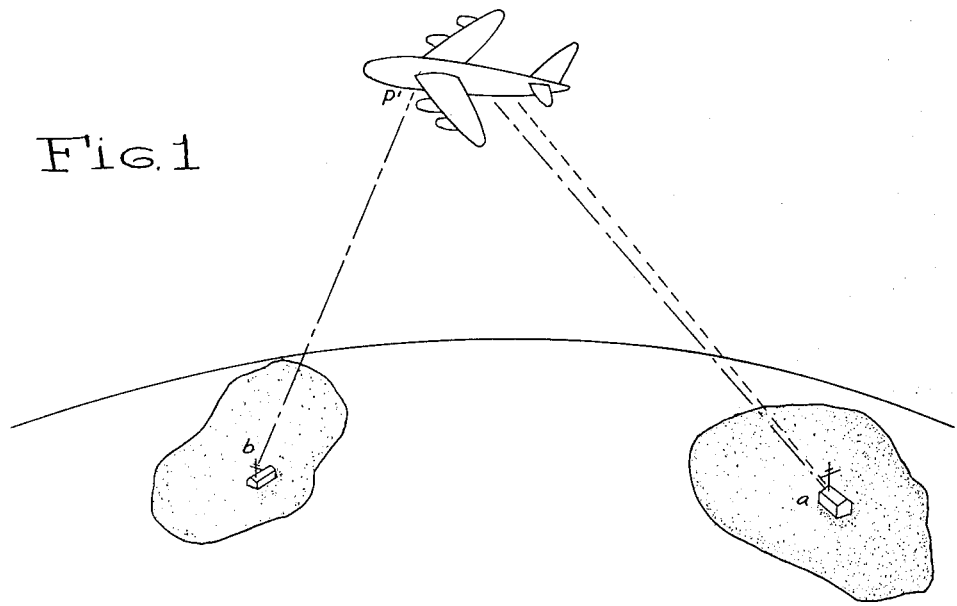
Fig.1
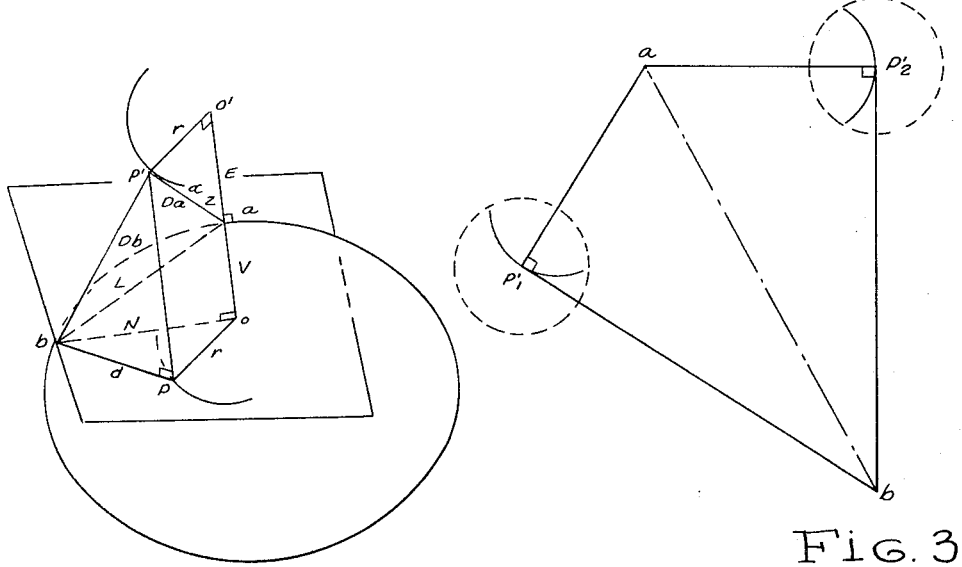
Fig.2
Fig.3
INVENTOR
EMANUEL M. SODANO
BY  *Joseph A. Hill*
ATTORNEY

United States Patent Office 3,351,942
Patented Nov. 7, 1967

3,351,942
METHOD FOR THE DETERMINATION OF DISTANCE AND/OR DIRECTION BETWEEN NON-INTERVISIBLE DISTANT STATIONS
Emanuel M. Sodano, 8105 Riverside Ave.,
Cabin John, Md. 20731
Filed Aug. 26, 1964, Ser. No. 392,360
8 Claims. (Cl. 343—112)

The invention described herein may be manufactured and used by or for the Government for governmental purposes without the payment to me of any royalty thereon.

This invention relates to a method for making geodetic or astronomically related measurements to determine the distance and/or direction between two non-intervisible stations.

More specifically, this invention relates to a method for making measurements to determine the distance and/or direction between two non-intervisible stations requiring optical or other measurements of direction to be made from only one of the stations.

Further, this invention relates to a method for making measurements to determine the distance and/or direction between two non-intervisible stations without measuring any or necessarily all atmospheric conditions such as pressure, temperature and humidity between the two stations.

Moreover, this invention relates to a method for making measurements to determine the distance and/or direction between two non-intervisible stations without requiring stringent or critical navigational control of an intermediary object overhead.

In the art of mapping the surface of the earth it is often required to measure directions and distances between two widely separated points which are not intervisible. For example, it may be required to be able to determine the direction and distance of a station on an island from a distance station on a thickly wooded land area.

In the past, the direction has been determined by use of two-station or three-station azimuth methods while the distance has been determined by four-station or two-station ranging methods. All of these methods have certain disadvantages which this invention overcomes. For instance, all of the methods which rely only on range measurements can not provide the astronomical azimuth. Also, all of the methods which rely only on azimuth measurements require essentially simultaneous aerial observations from several stations, which is impractical under weather conditions which prevent such optical simultaneity from all stations. The four-station ranging method has the disadvantage of requiring excessive equipment as well as the fact that the configuration of available ground stations might not be geometrically strong. The two-station azimuth method requires the movement of the aerial point to be in an accurate straight line in addition to the necessity of optical observations from both stations. The two-station ranging method also requires that the flight be in an accurate straight line and that the overhead object be at a relatively low altitude which precludes the use of satellites to provide the aerial intermediary point.

This invention, therefore, comprises an improved method of making these measurements in that it requires no straight flight, no prescribed station configuration since only two stations are used, usually partial or no measurements of atmospheric conditions and observation of directions from only one of the two stations, thus involving no optical simultaneity at all. Such other measurements as may be required will consist of so-called all weather electronic distance determinations. This combination of measurements provides a method of making the required recordings under weather conditions that allow visual observation of the aerial vehicle from only one of the two stations. This method allows for a determination of the distance and/or direction between two stations. The method therefore can be applied to long traverse lines in the absence of geodetic triangles. In addition, the azimuth between stations as determined by the method would be indispensable for the accurate Laplace orientation of long line trilateration nets.

In addition to the advantages of using only two stations and making optical observations from only one of them, other advantages of this invention are as follows:

(a) The flight path of the aerial vehicle may be completely random or, at most, an approximate circle around one of the stations rather than accurate straight flights which are difficult to maintain. Obviously the new procedure can utilize not only airplanes, but unguided balloons, rockets or satellites, if necessary, without loss of accuracy. Also, by making random flights or retracing a prescribed circle approximately, observations from two or more passes can be combined whenever the separate ones produce insufficient data because of cloudiness or other difficulties.

(b) The use, by present azimuth methods, of the Universal Transverse Mercator projection in the geodetic and mathematical reductions can be discarded. Thus, several theoretical and numerical assumptions and geodetic corrections are avoided.

(c) Collection of atmospheric data is not necessary when only the direction between stations is required, since the recorded geodetic measurements may then be treated as precise in the relative sense, rather than accurate in the absolute sense. This elimination of atmospheric effects indicates the possibility of determining large geodetic triangles without systematic or proportional errors, by the intersection of pairs of station lines whose directions, but not distances, have been determined.

Other objects will become apparent from the following description and accompanying drawings taken in connection with the following claims.

For a fuller understanding of the nature and objects of the invention as well as for a specific embodiment thereof, reference should be made to the following detailed description and the accompanying drawings in which:

FIG. 1 is a diagrammatic representation of the basic spatial relationships and measurements required in this method;

FIG. 2 is a diagram of additional relationships explaining the derivation of certain mathematical formulae; and FIG. 3 is a plan view representing the general and specific prescribed areas of the aerial objects positions relative to the line joining stations $a$ and $b$.

With reference to FIG. 1 there is shown a diagram representing a portion of the surface of the earth and the atmosphere above said surface. Two points on the surface of the earth are represented by letters $a$ and $b$. These two points represent two non-intervisible points on the surface of the earth. For purposes of this description, station $a$ is assumed to be the initial reference station and station $b$ is the station whose distance and/or direction is to be determined. This invention consists of a novel method of taking the measurements necessary for making the determination of the distance and/or direction from station $a$ to station $b$. The manner in which the necessary measurements are made between any type of aerial object $p'$ and the stations $a$ and $b$ will be described below.

With reference to FIG. 3, the electronically measurable distances from $a$ and $b$ to $p_1'$ and $p_2'$ represent such lengths as will intersect at $p_1'$ and $p_2'$ at approximate right angles. The circular arcs through $p_1'$ and $p_2'$ have their centers approximately at $a$ and radii generally, though not strictly limited to, somewhat less than half the distance between $a$ and $b$. The circles around $p_1'$ and $p_2'$ may have radii generally up to, but not strictly limited to, about one third of the distance from their respective centers to $a$.

As represented by FIG. 3, the intermediary aerial object may be located within the circles around $p_1'$ and/or $p_2'$, or within (but not strictly limited to) a one mile wide corridor along the length of the circular arc through $p_1'$ and/or $p_2'$. In addition, for each position in the corridor through $p_1'$ or $p_2'$, a position symmetric to it with respect to line $\overline{ab}$ may be chosen in the other corridor, the symmetry being again approximate within (but strictly limited to) one mile.

In the FIG. 3 plan view, $p_1'$ and $p_2'$ actually represent aerial positions which are high enough for obtaining unobstructed measurements to and/or from stations $a$ and $b$. Points $p_1'$ and $p_2'$ are within (but not strictly limited to) one mile of the same height, and in turn, the points on the arcs through them and those around them are within (but not strictly limited to) one mile of a common horizontal plane. As a further generalization, the circles around $p_1'$ and $p_2'$ may be regarded as spheres.

It has been discovered that if an aerial point $p'$ is provided moving in an approximate arc of a circle and/or at a nearly constant elevation or randomly around point $a$ on the earth's (or similar) surface, the distance and/or direction to point $b$ on the surface may be determined from simultaneous measurements of the distances between points $a$ and $p'$ and between points $b$ and $p'$ and the measurement of the direction of the aerial point $p'$ from the station $a$. It has been further discovered that most or all of the collection of atmospheric data for correcting the refraction and velocity changes suffered by the measured directions and distances can be avoided. The atmospheric data collection can be avoided to the degree that the aerial object's location is less generalized, such as from a sphere to a plane and then to a lineal arc. Moreover, when only the direction from $a$ to $b$ is required, all of the atmospheric data is eliminated by observing pairs of approximately symmetric points. In practice, a plurality of single or paired points must be observed. Detailed specifications for atmospheric correction requirements are contained in subsequent explanations.

The method of making these determinations of the distance and direction is based upon certain mathematical relationships which applicant has discovered. These mathematical relationships are explained in the following mathematical analysis.

With reference to FIG. 2, the object is to determine the distance and direction from $a$ to $b$. Point $p'$ represents the aerial position of a vehicle which, although shown on the circumference of a circle, may actually be assumed at no special location if unguided. Let the vehicle's distances to $a$ and $b$ be measured electronically (or otherwise) at the same instant that a tracking theodolite (or other optical or electronic angle-measuring equipment utilizing terrestrial or star-field referencing) determines the direction of the vehicle from $a$. Let $D_a$ and $D_b$ be the geometrical chords of the atmospherically refracted lines just recorded. Draw a plane through $b$ and perpendicular, at $o$, to the extension of the normal or zenith through $a$. From $p'$, drop a line perpendicular to the plane at $p$ and complete the rectangle $p'poao'$. $D_a$ then lies in the plane formed by the rectangle and projects into $r$, while $D_b$ projects into $d$. Let $\alpha_z$ represent the zenith angle $o'ap'$.

When (due to the motion of $p'$) point $p$ intersects the straight line $\overline{ob}$, angle $bpo$ becomes 180° and the two planes $p'o'op$ and $p'bp$ through $p'p$ become coincident. Since the resulting single plane passes through the normal $\overline{ao}$ and through $b$, it represents the normal section azimuth ($\alpha_N$) from $a$ to $b$. This azimuth projects along line N. Correspondingly, the projected direction ($o$ to $p$) of the airplane will be denoted as $\alpha$. For any arbitrary position of the vehicle, $p'$, the variable angle $bop$, difference in bearing of lines $op$ and $ob$, $\alpha$ and $\alpha_N$, respectively, can therefore be expressed by:

$$\alpha - \alpha_N = \angle bop \quad (1)$$

Applying the law of cosines to the plane triangle $bop$:

$$d^2 = r^2 + N^2 - 2rN \cos(\alpha - \alpha_N) \quad (2)$$

By means of the Pythagorean theorem and a few trigonometric relationships, $d^2$ can be also expressed successively as follows:

$$d^2 = D_b^2 - (E+V)^2 = D_b^2 - (D_a \cos \alpha_z + V)^2$$
$$= D_b^2 - D_a^2(1 - \sin^2 \alpha_z) - V^2 - 2VD_a \cos \alpha_z$$
$$= D_b^2 - D_a^2 + r^2 - V^2 - 2VD_a \cos \alpha_z \quad (3)$$

Equating (2) to the last form of (3) and eliminating $r$:

$$D_b^2 = (N^2 + V^2) + D_a^2 + 2VD_a \cos \alpha_z$$
$$- 2ND_a \sin \alpha_z \cos(\alpha - \alpha_N) \quad (4)$$

where the square of the required chord length from $a$ to $b$ of FIG. 2 is given by $$L^2 = N^2 + V^2 \quad (5)$$

and its angle of depression relative to the horizontal at station $a$ is obtained from $$\tan \alpha_L = V \div N \quad (6)$$

Formula 4 is a theoretically rigorous three dimensional relationship that is independent of the size and shape of the earth. In practice, it is limited only by the degree of accuracy with which the input $D_a$, $D_b$, $\alpha_z$, and $\alpha$ can be obtained from the associated measured distances and directions, corrected for atmospheric refraction and electromagnetic wave velocity. The output N, V, and $\alpha_N$ consists of exact constants which can be determined best by least squares. Up to this point, it should be noted, Formula 4 is general enough for application to any horizontally or vertically uncontrolled path of an airplane, balloon, rocket or satellite.

Numerous formulae are available for computing the difference between an electronically measured arc length (S) and the corresponding geometric chord (D), in order to correct for refraction and velocity changes induced by atmosphere on electromagnetic waves. For the purpose of the present paper, the form of such mathematical expressions is even more critical than the actual numerical magnitude of the correction, because the literal formula must permit convenient substitution into subsequent derivation equations. From applicable literature it was determined that, even for some of the more accurate formulae, the relationship between chord and arc could be reduced rigorously to the following simple form of power series:

$$D = S(K_0 + K_2 S^2 + K_4 S^4) \quad (7)$$

By transforming Formula 89 of Ohio State University Mapping and Charting Technical Paper No. 194 into terms corresponding to (7) above, the following expressions for the K coefficients were deduced:

$$K_0 = 1 + n_0 - \frac{\Sigma n}{2} + \frac{\Delta h \Delta n'}{12} \quad (8)$$

$$K_2 = \frac{\Sigma n'}{24R} + \frac{\Delta n \Sigma n'}{12 \Delta h} + \frac{(\Delta n')^2}{96} - \frac{(\Delta n)^2}{8(\Delta h)^2} \quad (9)$$

$$K_4 = \frac{(\Delta n)^2 \Delta n'}{48(\Delta h)^3} + \frac{\Delta n \Delta n'}{48R(\Delta h)^2} - \frac{\Delta n \Delta n' \Sigma n'}{144(\Delta h)^2} - \frac{\Delta n' \Sigma'}{144 R \Delta h} \quad (10)$$

where $R$ = Radius of spherical approximation to earth beneath ray path;

$n_0$ = Index of atmospheric refraction designed into electronic distance instrument, or electromagnetic velocity in vacuum ÷ velocity designed into instrument;

$n$ = Index of atmospheric refraction as a function of height ($h$) above sea level = $a_0 + a_1 h + a_2 h^2$;

$$n' = \frac{dn}{dh}, \quad \Delta(*) = (*)_A - (*)_G, \quad \Sigma(n') = (n')_A + (n')_G$$

$*$ = $n$, $n'$ or $h$; and subscripts G and A denote evaluation at ground and at aerial station.

The numerical example given on page 53 of a paper published by J. Schreiter titled, "Formulas Relating Shoran Measurements to Geodetic Data," published in The Ohio State University Mapping and Charting Research Laboratory Technical Paper No. 194 (1955), can therefore be represented by the following:

$$D = S(1.00008857 - .00008242 \times 10^{-5} S^2 - .00000294 \times 10^{-10} S^4) \quad (11)$$

where S is the given slant range of 194.18493 nautical miles from ground to air.

Equations 8 through 10 and associated definitions show that the K's for (7), independently of S and its powers, approach constancy under the following conditions: a fixed ground station elevation, a substantially constant aerial vehicle height, and a relatively stable atmosphere over the area of operation. In such case, the square of (7) can be represented by means of another set of constants as follows:

$$D^2 = S^2(K_x + K_y S^2 + K_z S^4) \quad (12)$$

In addition, if S varies by a limited extent only, the sum of the parenthetical terms of (7) will approach constancy because of the smallness of the coefficients of $S^2$ and $S^4$ as shown by (11). Therefore by using an airplane, which can fly at a fairly constant elevation and can approximate a circular arc around one of the ground stations by means of substantially equal slant range measurements S, Equation 7 can be reduced to:

$$D = SK \quad (13)$$

The geometry of this circular arc flight is illustrated in FIG. 1. It can be shown that if poor piloting were to cause the radial slant range S to vary by as much as ±.25 nautical mile (about ±1520 feet), D computed by (13) would differ from (11) by only one inch in spite of the false assumption that its only K remain absolutely constant. (The optical vertical refraction will be treated later, although it could also be corrected in a manner similar to (13).)

All subsequent derivations will treat K's as constants, with flights conforming thereto. Whenever feasible, such constants will express the chord D in terms of the directly measured arc length S. This will provide accurate formulae that avoid extensive calculations of variables and, when the values of the constants can be determined by empirical solutions, will dispense with the expensive acquisition of atmospheric index of refraction data.

The substitution of (12), for station $b$, into (4) gives:

$$K_x S_b^2 + K_y S_b^4 + K_z S_b^6 = (N^2 + V^2) + D_a^2 + 2VD_a \cos \alpha_Z - 2ND_a \sin \alpha_Z \cos (\alpha - \alpha_N) \quad (14)$$

Now substitute (13) and its square, both for station $a$, into (14), and divide the result by $K_a^2$ to obtain:

$$K_e S_b^2 + K_f S_b^4 + K_g S_b^6 = (K_N^2 + K_V^2) + S_a^2 + 2K_V S_a \cos \alpha_Z - 2K_N S_a \sin \alpha_Z \cos (\alpha - \alpha_N) \quad (15)$$

where $$K_N = N \div K_a \quad (16)$$

$$K_V = V \div K_a \quad (17)$$

$K_e$ is close to unity, aand $K_f$ and $K_g$ are very small. Next, let Equation 15 be applied to FIG. 2 at two points, $p_1$ and $p_2$, instead of one.

$$(K_e S_{1b}^2 + K_f S_{1b}^4 + K_g S_{1b}^6) = (K_N^2 + K_V^2) + S_{1a}^2 + 2K_V S_{1a} \cos \alpha_{1Z} - 2K_N S_{1a} \sin \alpha_{1Z} \cos (\alpha_1 - \alpha_N) \quad (18)$$

$$(K_e S_{2b}^2 + K_f S_{2b}^4 + K_g S_{2b}^6) = (K_N^2 + K_V^2) + S_{2a}^2 + 2K_V S_{2a} \cos \alpha_{2Z} - 2K_N S_{2a} \sin \alpha_{2Z} \cos (\alpha_2 - \alpha_N) \quad (19)$$

Bearing in mind that $K_f$ and $K_g$ are very small, it is apparent that if $S_{1b}$ is chosen nearly equal to $S_{2b}$, the following corresponding products in Equations 18 and 19 will be essentially equal:

$$K_f S_{1b}^4 \approx K_f S_{2b}^4 \quad (20)$$

$$K_g S_{1b}^6 \approx K_g S_{2b}^6 \quad (21)$$

The preceding assumptions correspond to the condition that for any point $p_1$ in FIG. 2, subsequently a $p_2$ will be obtained nearly symmetric to it with respect to the opposite side of line N. Now, by subtracting Equation 19 from Equation 18, the constant $(K_N^2 + K_V^2)$ as well as the terms represented by (20) and (21) will cancel out and leave:

$$K_e(S_{1b}^2 - S_{2b}^2) = (S_{1a}^2 - S_{2a}^2) + 2K_V(S_{1a} \cos \alpha_{1Z} - S_{2a} \cos \alpha_{2Z}) + 2K_N[S_{2a} \sin \alpha_{2Z} \cos (\alpha_2 - \alpha_N) - S_{1a} \sin \alpha_{1Z} \cos (\alpha_1 - \alpha_N)] \quad (22)$$

If the difference in length between any paired ($S_{1b}$, $S_{2b}$) in (22) is as much as ± .25 nautical mile because of their lack of symmetry around N or due to variations from a circular flight, the resulting error will again be only about one inch.

The equations that will provide the four principal solutions (4), (14), (15) and (22) will now be put into a form suitable for least squares by separating the constant azimuth $\alpha_N$ from the variable horizontal azimuths and joining its sine or cosine to every N or $K_N$:

$$D_b^2 = [(N \cos \alpha_N)^2 + (N \sin \alpha_N)^2 + V^2] + D_a^2 + 2VD_a \cos \alpha_Z - 2N \cos \alpha_N D_a \sin \alpha_Z \cos \alpha - 2N \sin \alpha_N D_a \sin \alpha_Z \sin \alpha \quad (4')$$

$$K_x S_b^2 + Y_y S_b^4 + K_z S_b^6 = [(N \cos \alpha_N)^2 + (N \sin \alpha_N)^2 + V^2] + D_a^2 + 2VD_a \cos \alpha_Z - 2N \cos \alpha_N D_a \sin \alpha_Z \cos \alpha - 2N \sin \alpha_N D_a \sin \alpha_Z \sin \alpha \quad (14')$$

$$K_e S_b^2 + K_f S_b^4 + K_g S_b^6 = [(K_N \cos \alpha_N)^2 + (K_N \sin \alpha_N)^2 + K_V^2] + S_a^2 + 2K_V S_a \cos \alpha_Z - 2K_N \cos \alpha_N S_a \sin \alpha_Z \cos \alpha - 2K_N \sin \alpha_N S_a \sin \alpha_Z \sin \alpha \quad (15')$$

$$K_e(S_{1b}^2 - S_{2b}^2) = (S_{1a}^2 - S_{2a}^2) + 2K_V(S_{1a} \cos \alpha_{1Z} - S_{2a} \cos \alpha_{2Z}) + (2K_N \cos \alpha_N)(S_{2a} \sin \alpha_{2Z} \cos \alpha_2 - S_{1a} \sin \alpha_{1Z} \cos \alpha_1) + (2K_N \sin \alpha_N)(S_{2a} \sin \alpha_{2Z} \sin \alpha_2 - S_{1a} \sin \alpha_{1Z} \sin \alpha_1) \quad (22')$$

In addition to possibly some of the purely atmospheric parameters ($K_x$, $K_y$, $K_z$, $K_e$, $K_f$, $K_g$), the preceding four equations contain either of the following two sets of constants and perhaps their squares:

V, N sin $\alpha_N$, N cos $\alpha_N$ (23) (24) (25)

$K_V$, $K_N$ sin $\alpha_N$, $K_N$ cos $\alpha_N$ (26) (27) (28)

The tangent of the required normal section azimuth $\alpha_N$ is obtained from (24)÷(25) or (27)÷(28), whereupon N can be obtained by substituting $\alpha_N$ back into (24) or (25) only. This means that only Equations 4' and 14' can provide, in addition to $\alpha_N$, N and V for the solution of the required chord length L from (5). Finally, the tangent of the chord's angle of depression is obtained from $V \div N$ according to (6) or, as evident from (16) and (17), using $K_V \div K_N$.

In addition to their difference in number of unknown constants and in whether the distance as well as the azimuth can be obtained, the four principal solutions differ by the type of flight and extent of atmospheric data requirements. For example (22'), which gives only the azimuth, has had all chords D replaced by the directly measured arcs S; therefore it requires no acquisition of atmospheric index of refraction data. Also, it is the only equation that is linear in its constants and, since it pairs off approximately equal distances from station $b$, systematic errors will cancel by subtraction. The other equations require atmospheric data between the aerial point and both, one, or no ground stations depending upon the D's eliminated. The constants of (15') and (22') can be determined wholly empirically because of their substantially circular flight at a fairly constant elevation, whereas (4') places no constraint on flight variations but the resulting variable K's must be computed individually from terms of (8), (9) and (10). $D_a$ for (14') is calculated using the constants of (13) or (7), depending upon whether the level flight is approximately circular or not.

The zenith angle $\alpha_Z$, which appears in all principal formulae, can of course be replaced by the angle of elevation $\alpha_h$ by substituting the complementary trigonometric function. Their vertical refraction can be kept practically constant if the flight altitude, or $\alpha_h$ as relayed to the pilot, and the radius are maintained fairly constant. Therefore, $\alpha_h$ (including refraction itself) could be assigned an average value, especially if the angle of elevation is small. In fact, its value could be determined simply as an empirical constant from the already required least squares solution. For example, by assuming $\alpha_{1Z}$ and $\alpha_{2Z}$ in (22') to be equal and constant, the following parameters instead of its (26), (27) and (28) would be determined:

$$K_V \cos \alpha_Z \tag{29}$$

$$K_N \sin \alpha_N \sin \alpha_Z \tag{30}$$

$$K_N \cos \alpha_N \sin \alpha_Z \tag{31}$$

In practice, observed azimuths involve plane rather than geodetic sections. Since the directions in FIG. 2 will be observed only from station $a$, derivation by plane sections avoids the azimuth correction for the otherwise skew normals that would have resulted if the elevated aerial position had been projected perpendicular to the spheroid rather than made parallel to the normal of $a$. Also, the observed plane section directions from $a$ to $p'$ are not to be reduced by geodetic azimuths. Thus the only azimuth corrections that may be required are those due to: a large deviation of the vertical at $a$ in the component at rights angles to $D_a$, combined with a high angle of elevation ($\alpha_h$) of $D_a$; a large relative skewness of the spheroid normals at $a$ and $b$, combined with a large elevation of $b$ from sea level; and of course the difference between the plane section's $\alpha_N$ and the geodetic azimuth from $a$ to $b$. On the other hand, if from $a$ to $b$ the astronomic rather than the geodetic azimuth is required, the correction to $\overline{ap}$ for the deviation of the vertical that $a$ must be omitted. In this case the plane through station $b$ is considered to be perpendicular to the astronomic vertical, rather than to the spheroid's normal, at station $a$. In fact, it is strictly with respect to this local astronomic vertical, rather than the spheroid's normal, that the zenith angle of the aerial point can be directly and rigorously observed. Finally, the geodetic distance is generally obtained from the chord by calculating a corresponding circular arc based on the average radius of curvature between stations $a$ and $b$, taking their elevations into consideration. A more sophisticated procedure is to consider the distance as an arc of an appropriate ellipse.

It does not matter whether horizontal theodolite directions are taken clockwise or counter-clockwise, or with respect to a known or arbitrary reference line. This is because the difference $(\alpha - \alpha_N)$ in (2) can change only in sign and thus not affect the value of the cosine. The true reference value can be applied to the result later by addition of a constant. In fact, by adopting a reference direction that makes the observed values for $\alpha$ have approximately equal absolute sines and cosines, the least squares observation equations can be assumed equal in weight. The accuracy of angular tracking can be improved, especially for relatively uniform, though rapid, circular motion, by the use of an electrically driven theodolite with speed controls. Camera recordings of strobe-illuminated cross hairs and of horizontal and vertical circles can be used for subsequent correction of residual tracking errors. To be sure that all recordings take place only when the aerial point is visible from the optical ground station $a$, the recording instants should be determined by the optical observer. Star background photography could also be used for the azimuth recordings.

Thus the foregoing mathematical derivation and analysis have shown that by application of any one of the foregoing formulae, number 4' or 14' or 15' or 22', the observed measurements taken according to the process described herein can be used to determine the distance and/or direction between two non-intervisible points on the earth or similar surface. Actually, the formulae establish a total of six modes of operation, each mode representing a unique combination of the flight pattern of the intermediary aerial object, the extent of atmospheric data collection for correction of the distance and direction measurements, and the choice of determining the direction above or the direction and distance between stations $a$ and $b$. The six modes will be listed subsequently.

All six modes of operation have the following elements in common:

(a) The flight path of the aerial object renders more accurate results when it is in the vicinity of $p_1'$ and $p_2'$, shown in FIG. 3 plan view. The horizontal component distance of these two points from station $a$ would be generally about half of the length from station $a$ to station $b$, and the horizontal component distances from station $b$ would be such as to form right angles at $p_1'$ and $p_2'$.

(b) For any acceptable instantaneous position of the aerial object, its direction from station $a$ is measured at the same moment that its distances from stations $a$ and $b$ are measured, as shown in FIG. 1.

As noted earlier, some of the aforementioned distance and direction measurements require corrections for atmospheric effects on their vertical components. Accordingly, appropriate measurements of atmospheric pressure, temperature and humidity are required to determine the true chord distances $D_a$ and $D_b$ and the true vertical angles $\alpha_Z$, $\alpha_{1Z}$, and $\alpha_{2Z}$, whenever called for in Equations 4', 14', 15' or 22'. On the other hand, no atmospheric corrections are required for the quantity S regardless of its subscripts, since it does not represent chord distances but rather the directly measured atmospherically refracted distances.

Since the chord $D_a$ and the vertical angles $\alpha_Z$, $\alpha_{1Z}$ and $\alpha_{2Z}$ represent lines connecting the aerial object to station $a$, their true values depend on corrections obtained from the measurement of atmospheric conditions along that particular spatial path. Similarly, since chord $D_b$ represents the line connecting the aerial object to station $b$, its true value depends on corrections obtained from the measurement of atmospheric conditions along the corresponding spatial path. Accordingly, in the following listing of the six operational modes for obtaining the distance and/or direction between stations $a$ and $b$, it will be noted whether atmospheric data is required between the aerial object and station $a$, or station $b$, or neither.

With reference to FIG. 3, the three operational modes which individually provide the distance as well as the direction between stations $a$ and $b$ are the following:

(1) Distance and direction measurements are taken when the aerial point is moving randomly within the spheres whose centers are $p_1'$ and $p_2'$, and whose radii are about one third of the distance from their respective centers to $a$. Atmospheric data is obtained between the aerial object and stations $a$ and $b$. The final solution is obtainable from Equation 4'.

(2) Distance and direction measurements are taken when the aerial point is moving sufficiently close to a single horizontal plane and is moving randomly within the indicated circles around $p_1'$ and $p_2'$. Atmospheric data is obtained between the aerial object and station $a$ only. The final solution is obtainable from Equation 14'.

(3) Distance and direction measurements are taken when the aerial point is moving sufficiently close to a single horizontal plane and to the indicated portions of the circular arcs through $p_1'$ and $p_2'$, respectively. Atmospheric data is obtained between the aerial object and station $a$ only, the resulting corrections being essentially constant for all aerial points because of the circular arc path. The final solution is obtainable from Equation 14'.

The remaining three operational modes, which individually provide only the direction between stations $a$ and $b$, are given below:

(4) Distance and direction measurements are taken when the aerial point is moving sufficiently close to a single horizontal plane and to the indicated portions of the circular arcs through $p_1'$ and $p_2'$, respectively. Atmospheric data is obtained between the aerial object and station $a$ only, resulting in essentially constant corrections which are to be applied only to the directions. The final solution is obtainable from Equation 15'.

(5) Distance and direction measurements are taken when the aerial point is moving sufficiently close to a single horizontal plane and to one of the indicated portions of the circular arcs through $p_1'$ and $p_2'$, respectively. Subsequently, similar measurements are taken when the aerial object is located at a point which is sufficiently symmetric to the first point relative to the opposite side of the line joining station $a$ to station $b$. Atmospheric data is obtained between the aerial object and station $a$ only, resulting in esentially constant corrections which are to be applied only to the directions. The final solution is obtainable from the linear Equation 22' by entering the symmetrically paired measurements.

(6) Symmetrically paired distance and direction measurements are taken in the same manner as for mode (5) above. No atmospheric data whatsoever is necessary. The final solution is obtainable from Equation 22' as modified however, by the mathematical terms numbered as 29, 30 and 31.

In the above six modes of operation the approximately defined positions of $p_1'$ and $p_2'$, as well as the radii of the circular arcs through and around $p_1'$ and $p_2'$, are to be regarded as reasonably flexible depending on required degrees of accuracy. Similarly, the degree with which the intermediary aerial object remains in a single horizontal plane, or moves along a perfectly circular path or is observed at exactly symmetrical points depends on how much of a variation in atmospheric corrections is to be regarded as essentially constant.

In order to obtain not only a complete solution, but one which is also increasingly accurate, a plurality of sets of observations are to be made. Although only when using Equation 22' it is necessary to have an equal number of observations on each side of the line joining station $a$ to station $b$ it is nevertheless advantageous to make as nearly an equal number of them as possible or practical for the other modes of operation. Measurements obtained from several approximately similar aerial passes can be combined if the separate passes do not provide sufficient data.

The simultaneous recording of the distance of the intermediary aerial object from stations $a$ and $b$ and its direction from station $a$ can be triggered by a common electronic signal pulse. The triggering pulse should in practice be initiated by the observer of the direction if he is using an optical instrument, because his measurements are most likely to be curtailed by clouds if recordings are made haphazardly at improper instants of time.

The intermediary aerial object can be a rocket, balloon, satellite, airplane, or similar vehicle carrying an electronic distance measuring device, and a reflecting surface or light source for obtaining the direction with tracking theodolite or celestial camera. Actually other means of obtaining distance and direction are not excluded. In practice, the higher flying objects should be used when the distance between stations $a$ and $b$ is so great that low objects could not permit an unobstructed line of sight over the horizon. When the stations are closer together, an airplane may be preferable because it can be flown sufficiently level and in a circular path, thus much of the atmospheric data acquisition and processing can be avoided as shown earlier.

I claim:

1. A method of making measurements to determine the distance and direction between first and second non-intervisible points on the surface of the earth comprising:
    (a) providing an intermediate point above the earth's surface, said point moving in at least one path from which both non-intervisible points are simultaneously in line of sight relationship;
    (b) producing an electrical signal for initiating electronic means, at said intermediate point, for producing a first signal effective to measure the distance between said intermediate point and said second point;
    (c) simultaneously producing with said first signal a second signal effective to measure the distance between said intermediate point and said first point, and actuating means for determining the direction of said intermediate point from said first point; and
    (d) recording said distance and direction measurements.

2. The method of claim 1 wherein:
    (a) two paths are provided, each path lying on opposite sides of the axis between the two non-intervisible points and being located within spheres symmetrically disposed about said axis, said spheres being centered at points where lines from said first and second points intersect at right angles and having radii equal to approximately ⅓ the distance from said center to said first point; and
    (b) said measurements are corrected for the atmospheric refraction of said signals between said intermediate point and said first and second points.

3. The method of claim 1 wherein:
    (a) two paths are provided, each path lying on opposite sides of the axis between the two non-intervisible points and being located on horizontal planes within spheres symmetrically disposed about said axis, said spheres being centered at points where lines from said first and second points intersect at right angles and having radii equal to approximately ⅓ the distance from said center to said first point; and
    (b) said measurements are corrected for the atmospheric refraction of said signals between said intermediate point and said first point.

4. The method of claim 3 wherein each path lies on a circular arc on said horizontal plane, each of said circular arcs being centered at said first point and having a radius equal to approximately ½ the distance between said first and second points.

5. A method of making measurements to determine the direction between first and second non-intervisible points on the surface of the earth comprising:
    (a) providing an intermediate point above the earth's surface, said point moving in a first path and a second path from which both of said first and second points are simultaneously in line of sight relationship, each path lying on opposite sides of the axis between said first and second points and being located on horizontal circular arcs of substantially the same altitude, said arcs being within spheres symmetrically disposed about said axis, said spheres being centered at points where lines from said first and second points intersect at right angles and having radii equal to approximately ⅓ the distance from said center to said first point; each of said circular arcs being centered at said first point and having a radius equal to approximately ½ the distance between said first and second points;

(b) producing an electrical signal for initiating electronic means at said intermediate point for producing a plurality of first signals effective to measure the distance between said intermediate point and said second point along said first path;

(c) simultaneously producing with each of said first signals a second signal effective to measure the distance between said intermediate point and said first point, and actuating means for determining the direction of said intermediate point from said first point along said first path;

(d) producing an electrical signal for initiating electronic means at said intermediate point for producing a plurality of third signals effective to measure the distance between said intermediate point and said second point along said second path which are symmetrically disposed with respect to the points from which the first signals measured the distance along said first path;

(e) simultaneously producing with each of said third signals a fourth signal effective to measure the distance between said intermediate point and said first point, and actuating means for determining the direction of said intermediate point from said first point along said second path; and (f) recording said distance and direction measurements.

6. The method of claim 5 wherein distance between said non-intervisible points may also be determined, further comprising the step of correcting the measurement of said second and fourth electrical signals for the atmospheric refraction of said second and fourth signals between said intermediate point and said first point along said first and second paths.

7. The method of claim 6 further comprising the step of correcting the measurement of said first and third electrical signals for the atmospheric refraction of said first and third signals between said intermediate point and said second point along said first and second paths.

8. A method of making measurements to determine the direction between first and second non-intervisible points on the surface of the earth comprising:

(a) providing an intermediate point above the earth's surface, said point moving in a first path and a second path from which both of said first and second points are simultaneously in line of sight relationship, each path lying on opposite sides of the axis between said first and second points and being located on horizontal circular arcs of substantially the same altitude, said arcs being within spheres symmetrically disposed about said axis, said spheres being centered at points where lines from said first and second points intersect at right angles and having radii equal to approximately ⅓ the distance from said center to said first point; each of said circuilar arcs being centered at said first point and having a radius equal to approximately ½ the distance between said first and second points;

(b) producing an electrical signal for initiating electronic means at said intermediate point for producing a first signal for measuring the distance between said intermediate point and said second point along said first path;

(c) simultaneously producing with said first signal a second signal for measuring the distance between said intermediate point and said first point, and actuating means for determining the direction of said intermediate point from said first point;

(d) producing an electrical signal for initiating electronic means at said intermediate point for producing a third signal for measuring the distance between said intermediate point and said second point along said second path;

(e) simultaneously producing with said third signal a fourth signal for measuring the distance between said intermediate point and said first point, and actuating means for determining the direction of said intermediate point from said first point; and (f) recording said distance and direction measurements.

References Cited

UNITED STATES PATENTS

| | | | |
|---|---|---|---|
| 3,078,460 | 2/1963 | Werner | 343—12 |
| 3,097,357 | 6/1963 | Durnal | 343—112 |
| 3,242,494 | 3/1966 | Gicca | 343—112 |

RODNEY D. BENNETT, *Primary Examiner.*

CHESTER L. JUSTUS, *Examiner.*

C. E. WANDS, *Assistant Examiner.*